(12) United States Patent
Li et al.

(10) Patent No.: US 9,957,414 B2
(45) Date of Patent: May 1, 2018

(54) ABRASION RESISTANT POLYURETHANE COATING, COATED ARTICLE AND METHOD OF MANUFACTURING THE SAME

(71) Applicant: PPG INDUSTRIES OHIO, INC., Cleveland, OH (US)

(72) Inventors: Ronald Li, Wellesley, MA (US); Alexander Bimanand, Burbank, CA (US)

(73) Assignee: PPG INDUSTRIES OHIO, INC., Cleveland, OH (US)

( * ) Notice: Subject to any disclaimer, the term of this patent is extended or adjusted under 35 U.S.C. 154(b) by 401 days.

(21) Appl. No.: 14/184,692

(22) Filed: Feb. 19, 2014

(65) Prior Publication Data

US 2015/0232695 A1     Aug. 20, 2015

(51) Int. Cl.
  *C09D 175/06* (2006.01)
  *B05D 1/30* (2006.01)
  *C09D 175/04* (2006.01)
  *C08G 18/28* (2006.01)
  *C08K 5/02* (2006.01)

(52) U.S. Cl.
  CPC ....... *C09D 175/06* (2013.01); *C08G 18/2885* (2013.01); *C08K 5/02* (2013.01); *C09D 175/04* (2013.01); *Y10T 428/264* (2015.01)

(58) Field of Classification Search
  CPC ....... C08K 5/02; C08L 75/04; C08G 18/2885; C09D 175/04; C09D 175/06; Y10T 428/264; B05D 1/30

USPC ........ 528/44, 61; 428/335, 423.1; 427/372.2
See application file for complete search history.

(56) References Cited

U.S. PATENT DOCUMENTS

| | | | |
|---|---|---|---|
| 4,435,450 A | | 3/1984 | Coleman |
| 4,594,402 A | * | 6/1986 | Coleman et al. ............... 528/49 |
| 4,731,289 A | | 3/1988 | Coleman |
| 5,648,149 A | | 7/1997 | Rukavina et al. |
| 5,840,429 A | | 11/1998 | Rukavina et al. |
| 6,001,923 A | * | 12/1999 | Moncur et al. ............... 524/590 |
| 7,736,745 B2 | | 6/2010 | Hong |
| 2014/0093738 A1 | * | 4/2014 | Bimanand et al. ........ 428/425.9 |

OTHER PUBLICATIONS

Mohamed et al., "Reducing Wear of Vehicle Surface Caused by Sand Erosion", International Journal of Scientific & Engineering Research, vol. 4, Issue 9, Sep. 2013, pp. 2559-2565.

* cited by examiner

*Primary Examiner* — Thao T Tran
(74) *Attorney, Agent, or Firm* — Lewis Roca Rothgerber Christie, LLP

(57) ABSTRACT

A coated substrate including a 1 to 3 mils thick coating layer has a Bayer abrasion resistance value of less than 1% Haze after 600 cycles. The coating layer includes a reaction product of a coating composition including a polyester diol, a di-isocyanate, and a fluorocarbon-based additive. A method of forming the coating layer on the substrate includes mixing reactants including a polyester diol, a di-isocyanate and a flurocarbon-based additive to form a polyurethane coating composition; depositing the polyurethane coating composition on the substrate; and curing the polyurethane coating composition to form an abrasion resistant coating on the substrate.

21 Claims, No Drawings

ABRASION RESISTANT POLYURETHANE COATING, COATED ARTICLE AND METHOD OF MANUFACTURING THE SAME

TECHNICAL FIELD

The following description is related to an abrasion resistant polyurethane coating composition, a coated article including the same, and a method of manufacturing the coated article.

BACKGROUND

The surface of a fast moving vehicle, such as an aircraft or an automobile, may be degraded by abrasion and impact from sand, rain, etc. While certain protective coatings designed to reduce the damage caused by these elements have been proposed, many of these coatings require a thick layer, which may lead to deteriorated optical quality and increased cost. To date, thinner layers have not exhibited satisfactory abrasion and/or impact resistance.

SUMMARY

An aspect of the present invention is directed toward an abrasion resistant polyurethane coating composition that provides a Bayer abrasion resistance value of less than 1% Haze after 600 cycles when coated to form a film with a thickness of 1 to 3 mils. Another aspect of the present invention is directed toward an article coated with the abrasion resistant polyurethane coating layer. Yet another aspect of the present invention is directed toward a method of manufacturing an article coated with the abrasion resistant polyurethane coating layer.

According to one embodiment of the present invention, a coating composition includes: a polyester diol; a di-isocyanate; and a fluorocarbon-based additive. The fluorocarbon-based additive may include a functional group reactive with —OH or —NCO. The fluorocarbon-based additive may include a hydroxyl functional group. The fluorocarbon-based additive may include a perfluorinated carbon atom and a hydroxyl functional group, an acrylate functional group, or a methacrylate functional group. The fluorocarbon-based additive may include two to twelve perfluorinated carbon atoms. The fluorocarbon additive may include a compound represented by $CF_3(CF_2)_nCH_2CH_2OH$, $CF_3(CF_2)_nCH_2CH_2COOCCH_3$, or $CF_3(CF_2)_nCH_2CH_2COOCCH_2CH_3$, wherein n is an integer, and n may be 5. The fluorocarbon-based additive may be included in an amount of 0.25% to 2% based on a total weight of the coating composition.

The polyester diol may have a weight average molecular weight of 500 to 2000. The polyester diol may be included in an amount of 2% to 15% based on a total weight of the coating composition. The polyester diol may include a caprolactone derived monomer terminated with a primary hydroxyl group at both ends. The polyester diol may be included in an amount of 2% to 50% based on a total weight of polyols in the composition.

The coating composition may further include a multifunctional polyol having three or more hydroxyl groups. The multifunctional polyol may include a tetra-functional polyol. The tetra functional-diol may be included in an amount of 10% to 30%, or 15% to 20% based on a total weight of the coating composition.

The coating composition may have a Brookfield viscosity of 80 to 120 cPs. The coating composition may have an NCO/OH ratio of 1 to 1.5. The coating composition may have a solids content of 50% to 90%.

According to another embodiment of the present application, a coated article includes a substrate; and a coating layer on the substrate, the coating layer including a polyurethane reaction product of reactants including: a polyester diol, a di-isocyanate, and a fluorocarbon-based additive. The coating layer may have a thickness of 25 microns to 100 microns. The coating layer may have a Bayer abrasion resistance value of less than 1% Haze after 600 cycles. The coating layer may have a surface Shore hardness of 60 A to 90 A.

According to yet another embodiment of the present application, a method for manufacturing an abrasion resistant substrate includes: mixing reactants including a polyester diol, a di-isocyanate and a flurocarbon-based additive to form a polyurethane coating composition; depositing the polyurethane coating composition on the substrate; and curing the polyurethane coating composition to form an abrasion resistant coating on the substrate. The depositing the polyurethane coating composition may include deposition by a continuous flow coating technique.

DETAILED DESCRIPTION OF THE INVENTION

In the following description and in the claims, various layers are described as being "on," "over," or "positioned over" one or more additional layers. This language simply denotes the relative positions of the layers. Thus, in some embodiments, two layers are directly next to each other, while in other embodiments, the same two layers are separated by one or more additional layer(s). In each case, one of the two layers is considered to be "on," "over," or positioned over" the other layer. Also, "on" or "over" can mean "below." For example, a layer that is "on" or "over" another layer can also be considered "below" the other layer, depending upon the point of view.

As used herein, the term "coated substrate" or "coated transparency" refers to a substrate or transparency that has been protected (e.g., coated) with one or more layer(s) on the substrate. The substrate or transparency can be made of glass or plastic, coated or uncoated, and can form a window or a windshield of a car, aircraft, boat, building, or any other suitable vehicle or structure.

In the following detailed description, only certain embodiments are shown and described, by way of illustration. As those skilled in the art would recognize, the invention may be embodied in many different forms and should not be construed as being limited to the embodiments set forth herein. Like reference numerals designate like elements throughout the specification.

According to embodiments of the present invention, a coated article includes a substrate and a coating layer on the substrate. The coating layer may be a polyurethane reaction product of a coating composition. The coating composition includes reactants including a polyester diol, a di-isocyanate, and a fluorocarbon-based additive.

The substrate may be any suitable material and may have any suitable shape. For example, the substrate may be part of an aircraft, an automobile, or a wind turbine. For example, the substrate may be an aircraft transparency. The substrate may be made of a metal, such as aluminum, stainless steel, or copper; glass; or a plastic material, such as polycarbonate, polyacrylates (such as polymethyl methacrylate), polyurethanes, polyethylene terephthalate, or polyvinyl chloride.

As noted above, the coating layer includes a polyurethane reaction product of reactants including a polyester diol, a di-isocyanate and a fluorocarbon-based additive. Although the polyurethane reaction product is described here as being a reaction product of reactants including a polyester diol, a di-isocyanate and a fluorocarbon-based additive, it is understood that the fluorocarbon-based additive does not necessarily react into the polyurethane network generated by the reaction of the diol with the di-isocyanate. Instead, the fluorocarbon-based additive may exist in the reaction product as an additive without reacting with the diol or di-isocyanate. In other embodiments, however, the fluorocarbon-based additive does react with either or both of the diol and the di-isocyanate and is therefore reacted into the polyurethane network.

As used herein, the term "polyester diol" refers to a compound having one or more ester functional groups and two primary hydroxyl groups. The primary hydroxyl groups may be connected by a polycaprolactone backbone (e.g., a caprolactone derived monomer terminated with a primary hydroxyl group at both ends), or a linear aliphatic backbone (having a first end including a hydroxyl group and a second end including another hydroxyl group).

The polyester diol may have a hydroxyl value of 100-300 mg KOH/g, and an acid value of 1 mg KOH/g or lower. For example, the polyester diol may have a hydroxyl value of 105-120 mg KOH/g, and an acid value of 0.5 mg KOH/g or lower. The polyester diol may have a weight average molecular weight of 200 to 2000. For example, the polyester diol may have a weight average molecular weight of 1000. Examples of suitable polyester diols include Capa™ 2101, Capa™ 2043, Capa™ 2054, or Capa™ 2085 by Perstorp Group, Sweden. The polyester diol may be included in an amount of 2% to 15% based on a total weight of the coating composition. For example, the polyester diol may be included in an amount of 3% to 7% based on a total weight of the coating composition.

The reactants may further include a multifunctional polyol having three or more hydroxyl groups for effective crosslinking. Suitable multifunctional polyols having three or more hydroxyl groups include, but are not limited to, tri-functional polyols and tetra-functional polyols. The multifunctional polyol can be an aliphatic compound having 3 or 4 hydroxyl groups, or a mixture of aliphatic compounds having an average of 3 or 4 hydroxyl groups. The multifunctional polyol can provide crosslinking and resiliency to a coating formed from the coating composition. Non-limiting examples of the multifunctional polyol include polyester polyols and polyether polyols. For example, in some embodiments, the multifunctional polyol may be a polycaprolactone polyol. For example, the multifunctional polyol may include a polycaprolactone structure having four caprolactone chains and four hydroxyl groups at a free terminal end of each caprolactone chain. An example representation of such a structure is shown below as Structure 1.

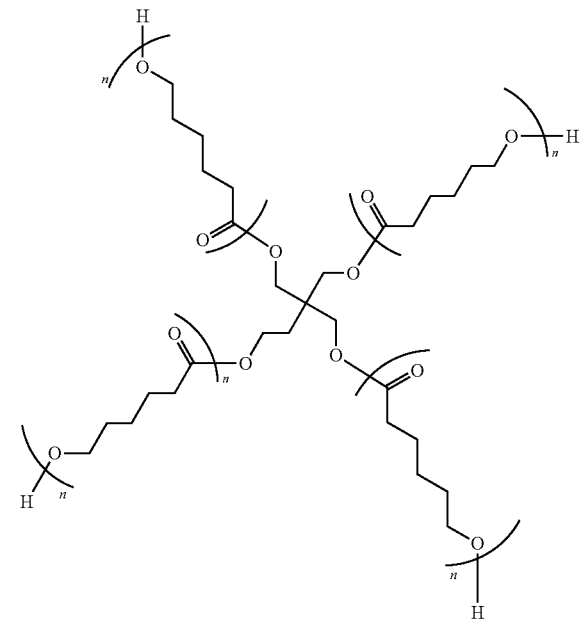

[Structure 1]

In the polyester polyol shown as Structure 1, n may be 1 to 6, such as 2 to 4. For example, in the polyester polyol shown as Structure 1, n may have an average value of 2. The repeating unit of each caprolactone chains (the portion included in the parenthesis) may have 2 to 10 $CH_2$ repeating units, for example, 4 to 7 $CH_2$ repeating units. When the polyester polyol is a polycaprolactone polyol including four polycaprolactone chains including one hydroxyl group at a terminal end of each polycaprolactone chain, the coating composition may form a coating having enhanced crosslink density. Additionally, the resultant coating may still have suitable flexibility due to the presence of the caprolactone units (e.g., 1 to 6 units of caprolactone) in each of the four chains.

The multifunctional polyol may have a hydroxyl value of about 100-350 mg KOH/g, and an acid value of about 2 mg KOH/g or lower. For example, the multifunctional polyol may have a hydroxyl value of about 210-240 mg KOH/g, and an acid value of about 1.0 mg KOH/g or lower. The multifunctional polyol may further include additional functional groups for enhanced cross-linking. For example, the multifunctional polyol may have five or more hydroxyl groups. The multifunctional polyol may have a weight average molecular weight of about 200 to about 2000. For example, the multifunctional polyol may have a weight average molecular weight of about 1000.

When such a multifunctional polyol having three or more hydroxyl groups is included in the reactants, the total weight of polyols (i.e., the polyester diol plus the multifunctional polyol) may be 15% to 50% based on a total weight of the coating composition. For example, the total weight of polyols may be 20% to 40% based on a total weight of the coating composition. The polyester dial may be included in the polyol component in an amount of 2% to 50% based on a total weight of polyols in the composition, for example 20% to 40% based on the total weight of polyols in the composition. For example, the polyester diol may be included at 10 wt % based on the total weight of polyols in the composition. Examples of suitable multifunctional polyols may include, but are not limited to, tetra-functional polyols such as Capa™ 4101, tri-functional polyols such as Capa™ 3050, or Capa™ 3091, all by Perstorp Group, Sweden; and Multranol 3900, Multranol 3901, Multranol 4011, Multranol 4012, Multranol 4034, Multranol 4035, Multranol 4050, Multranol 4063, all by Bayer Material Science, Germany.

The di-isocyanate may include any suitable compound with two isocyanate functional groups, and may be represented by OCN—R—NCO, where R includes an alkyl group, an aromatic group or a combination thereof. That is, suitable di-isocyanates may include aromatic isocyanates, aliphatic isocyanates, or combinations thereof. Nonlimiting examples of suitable aromatic isocyanates include toluene 2,4-diisocyanate, toluene 2,6-diisocyanate, 4,4'-methylene diphenyl diisocyanate, 2,4'-methylene diphenyl diisocyanate, polymeric methylene diisocyanate, p-phenylene diisocyanate, m-phenylene diisocyanate, naphthalene 1,5-diisocyanate, naphthalene 2,4-diisocyanate, 1,5-naphthalene diisocyanate, p-xylylene diisocyanate, and the like. Nonlimiting examples of suitable aliphatic isocyanates include isophorone diisocyanate, 1,4-cyclohexane diisocyanate, 4,4'-dicyclohexylmethane diisocyanate, bis(isocyanatomethyl) cyclohexane, tetramethylxylylene diisocyanate, 1,6-hexamethylene diisocyanate, and the like. Many of these isocyanates are commercially available from companies such as Bayer Corporation, BASF, ICI, Dow, Huntsman, and Degussa. Aliphatic isocyanates may exhibit greater stability relative to other isocyanates when exposed to ultraviolet (UV) light. Thus, a composition including an aliphatic isocyanate may be desirable for applications that require UV stability. However, the present invention is not limited to aliphatic isocyanates. In addition, isocyanates with more than two functional groups, such as tri-isocyanate, may also be included in the coating composition.

The fluorocarbon-based additive may include a compound having a functional group reactive with the hydroxyl group (—OH) of the polyester diol or multifunctional polyol, or the isocyanate group (—NCO) of the di-isocyanate so that the fluorocarbon-based additive may react into the polyurethane network. For example, in some embodiments, the fluorocarbon-based additive includes a hydroxyl functional group (which is reactive with the isocyanate group of the di-isocyanate component of the composition) or an isocyanate functional group (which is reactive with the hydroxyl group of the diol or multifunctional polyol component of the composition). However, the fluorocarbon-based additive is not limited thereto. For example, in some embodiments, the fluorocarbon-based additive is structured so that it does not react into the polyurethane network, and therefore remains a distinct chemical entity even after reaction of the polyols and di-isocyanates to form the polyurethane network. Those of ordinary skill in the art would be readily capable of selecting suitable functional groups for the fluorocarbon-based additive that would not react or would not react to a significant degree into the polyurethane network.

The fluorocarbon-based additive may have a perfluorinated carbon atom, and a hydroxyl functional group, an acrylate functional group, and/or a methacrylate functional group. For example, the fluorocarbon-based additive may include two to twelve perfluorinated carbon atoms. As would be understood by those of ordinary skill in the art, a "perfluorinated" carbon atom is one in which all hydrogen atoms bonded to the carbon atom are replaced with fluorine atoms. Suitable fluorocarbon-based additives may include those represented by the following formulas: $CF_3(CF_2)_n$ $CH_2CH_2OH$, $CF_3(CF_2)_nCH_2CH_2COOCCH_3$, or $CF_3(CF_2)_n CH_2CH_2COOCCH_2CH_3$ where n is an integer. In some embodiments, n is two to twelve, for example, five. For example, the fluorocarbon-based additive may be 3,3,4,4,5,5,6,6,7,7,8,8,8-tridecafluoro-1-octanol (e.g., CAPSTONE™ 62-AL, available from E.I. du Pont de Nemours and Company, Wilmington, Del.), and/or 2-methyl-2-propenoic acid, 3,3,4,4,5,5,6,6,7,7,8,8,8-tridecafluorooctyl ester (e.g., CAPSTONE™ 62-MA, available from E.I. du Pont de Nemours and Company, Wilmington, Del.).

The fluorocarbon-based additive may be included in an amount of 0.1 wt % to 5 wt % based on a total weight of the coating composition. In some embodiments, for example, the fluorocarbon-based additive may be included in an amount of 0.5 wt % to 2 wt % based on the total weight of the coating composition. For example, the fluorocarbon-based additive may be included in an amount of 1 wt % based on the total weight of the composition.

The coating layer may have a thickness of at least 25 μm, for example 25 μm to 100 μm. For example, the coating layer may have a thickness of 30 μm to 75 μm. In some embodiments for example, the coating layer has a thickness of 50 μm to 70 μm. Despite such a thin coating layer, the coating layer according to embodiments of the present invention may have enhanced abrasion resistance. For example, the coating layer may have a Bayer abrasion resistance value of less than 3% haze after 600 cycles. In one embodiment, the coating layer has a Bayer abrasion resistance value of less than 2% Haze after 600 cycles. In yet another embodiment, the coating layer has a Bayer abrasion resistance value of less than 1% Haze after 600 cycles. The coating layer may have other desirable properties, such as suitable hardness, blowing sand abrasion resistance, transparency, UV resistance, chemical resistance and resistance to rain erosion. For example, the coating layer may have a Shore hardness of 60 A to 100 A, or 68 A to 98 A.

According to embodiments of the present invention, the coating layer may be formed by depositing a coating composition on the substrate and curing the coating composition. The coating composition includes reactants such as the above described polyester diol, di-isocyanate and fluorocarbon-based additive. The coating formulation may further include a suitable solvent. Nonlimiting examples of suitable solvents include aliphatic hydrocarbons, aromatic hydrocarbons, ketones, esters, and the like. Nonlimiting examples of suitable aliphatic hydrocarbons include hexane, heptane, octane, and the like. Nonlimiting examples of suitable aromatic hydrocarbons include benzene, toluene, xylene, and the like. Nonlimiting examples of suitable ketones include methyl isobutyl ketone, diisobutyl ketone, methyl ethyl ketone, methyl hexyl ketone, ethyl butyl ketone, and the like. Nonlimiting examples of suitable esters include ethyl acetate, isobutyl acetate, amyl acetate, 2-ethylhexyl acetate, and the like. A mixture of solvents may be used to enhance coating characteristics such as viscosity, adhesion and appearance. When used, the solvent can be present in an amount of 10 to 50 weight percent based on the total weight of the coating composition. For example, the solvent may be present in an amount of 35 to 45 weight percent based on the total weight of the coating composition. However, the amount of the solvent is not limited to these ranges, and those of ordinary skill in the art would be readily capable of selecting an appropriate amount of solvent in order to tailor certain properties of the coating composition, such as viscosity and flowability.

The coating composition may further include conventional additives for coating compositions, such as chain extenders, stabilizers, anti-oxidants, fillers, UV absorbers, flow aids, rheology control agents, and catalysts for the curing reaction. Catalysts promote the curing reaction and may be tertiary amines, metal compound catalysts, or combinations thereof. Nonlimiting examples of suitable tertiary amine catalysts include triethylamine, N-methylmorpholine, triethylenediamine, pyridine, picoline, and the like. Nonlimiting examples of suitable metal compound catalysts include compounds of lead, zinc, cobalt, titanate, iron, copper, and tin. For example, the metal compound catalyst may be lead 2-ethylhexoate, zinc 2-ethylhexoate, cobalt naphthenate, tetraisopropyl titanate, iron naphthenate, copper naphthenate, dibutyl tin diacetate, dibutyl tin dioctate, dibutyl tin dilaurate, and the like.

When used, the catalyst may be present in a total amount ranging from about 0.001 to 0.05 weight percent based on the total weight of the solids in the coating composition. For example, the catalyst may be present in an amount ranging from about 0.005 to 0.02 weight percent based on the total weight of the solids in the coating composition.

Polyurethane polymers are susceptible to degradation caused by thermooxidative, thermal, or UV initiated degradation, the effects of which may be reduced or mitigated by a UV-absorber, or a stabilizer. Development of undesirable discoloration and reduction in mechanical properties are common issues that result from oxidative degradation of polyurethane polymers. In thermooxidation of a polyurethane polymer, the urethane group is relatively stable and the degradation starts at the polyether chain, for example, at the $CH_2$ group adjacent to or at the alpha position relative to the central linkage (e.g., the carbamate linkage). In aromatic-based polyurethanes, such as methylene diphenyl diisocyanate ("MDI"), the methylene bridge between the two aromatic rings of the MDI is also a point of photooxidative attack. In some instances, the oxidation of the polyurethane polymer may lead to a highly discolored and degraded polymer unless stabilizers are used.

Stabilizers can be added to the raw materials (e.g., incorporated into the compounds included in the raw materials) used to make the polyurethane polymer and/or stabilizers can be added as separate additives during the production of the polyurethane polymer. The stabilizers can include a reactive functional group, such as a hydroxyl group, to react with and chemically bond the stabilizers to the composition (e.g., the polyurethane polymer). In some embodiments, the stabilizers do not include a reactive functional group and/or do not react with and bond to the composition. The stabilizers can be added to reduce or retard the effect of thermooxidation of either the raw materials or the finished polyurethane polymer. For example, aliphatic-based polyurethane polymers are typically light-stable, but stabilizers may be necessary to reduce or retard the loss of mechanical properties. Examples of the stabilizers include any of the IRGANOX® antioxidants (available from BASF Corporation) and any hindered amine light stabilizers (HALS), but the present invention is not limited thereto. IRGANOX® is a registered trademark of Ciba Specialty Chemicalas Corporation (Tarrytown, N.Y.).

The UV-absorbers can be based upon any suitable UV-absorber. The UV-absorbers reduce or retard the effect of photooxidation by absorbing UV light that would otherwise result in the production of free radicals by breaking chemical bonds of other components of the composition. The UV-absorbers can include a reactive functional group, such as a hydroxyl group, to react with and chemically bond the UV-absorbers to the composition (e.g., the polyurethane polymer). In some embodiments, the UV-absorbers do not include a reactive functional group and/or do not react with and bond to the composition. Examples of the UV-absorber include any of the TINUVIN® UV-absorbers, but the present invention is not limited thereto. TINUVIN® is registered trademark of Ciba Specialty Chemicals Corporation (Tarrytown, N.Y.).

The amounts of the reactants in the coating composition may be selected such that a ratio of the isocyanate groups to the hydroxyl groups (i.e., the NCO/OH ratio) is 3:2 to 1:1. In some embodiments, for example, the amount of the reactants may be selected such that the NCO/OH ratio is 1.3.

Embodiments of the coating composition described herein may be formed by mixing (or blending) a Part A mixture (e.g., a base component) with a Part B mixture (e.g., a curing component). For example, the Part A mixture and the Part B mixture can be mixed together, coated on the substrate, dried and cured to form a durable composition (or coating) which is abrasion resistant. The drying may be accomplished by drying in air at ambient temperature, for example, for a time period of 1.5 to 2 hours. The curing may be accomplished by any suitable curing mechanism, for example, by heating for a period of time sufficient to effect cure. For example, in some embodiments, curing may be accomplished by heating the coated and dried composition at a temperature of 150 to 300° F. for a period of time of 1 to 8 hours. In some embodiments, for example, curing may be effected by heating the coated and dried composition at a temperature of 200° F. for a time period of 6 hours to form a coating.

The Part A mixture and Part B mixture may be mixed to achieve a ratio of reactive isocyanate groups to reactive hydroxyl groups (i.e., an NCO/OH ratio) of 3:2 to 1:1, for example an NCO/OH ratio of about 1.3.

The Part A mixture can include, for example, any or all of the polyols in the composition (e.g., the polyester diol and the multifunctional polyol), and the fluorocarbon-based additive. The Part A mixture can further include a solvent and one or more of the additives, such as the fillers, UV absorbers, flow aids, and rheology control agents, and catalysts for the curing reaction. The Part A mixture may include additional additives commonly used for a polyurethane coating as well. However, the Part A mixture need not contain all of these components. For example, the fluorocarbon-based additive need not be included in the Part A mixture and can be included in the Part B mixture instead. Similarly, the additional additives (e.g., fillers, UV absorbers, flow aids, and rheology control agents, and catalysts) need not be included in the Part A mixture, and can be included in the Part B mixture instead. Alternatively, the fluorocarbon-based additive can be present in both the Part A mixture and the Part B mixture, and the additional additives (e.g., fillers, UV absorbers, flow aids, and rheology control agents) can also be present in both the Part A mixture and the Part B mixture.

The Part B mixture (e.g., curing component) can include the di-isocyanate as described above. The curing component can further include additives such as cure accelerators, cure retardants, plasticizers, additives, and/or fillers. Selection of suitable cure accelerators, cure retardants, plasticizers, additives, and fillers is within the skill of those of ordinary skill in the art and, therefore, further discussion of those components will be omitted. The Part B mixture can also include the fluorocarbon-based additive and/or the additional additives (e.g., fillers, UV absorbers, flow aids, and rheology control agents, and catalysts) discussed above with respect to the Part A mixture. The Part A mixture may include additional additives commonly used for a polyurethane coating as well. However, the Part B mixture need not contain all of these components. For example, the fluorocarbon-based additive need not be included in the Part B mixture and can be included in the Part A mixture instead. Similarly, the additional additives (e.g., cure accelerators, cure retardants, plasticizers, additives, and/or fillers, as well as UV absorbers, flow aids, and rheology control agents) need not be included in the Part B mixture, and can be included in the Part A mixture instead. Alternatively, the fluorocarbon-based additive can be present in both the Part A mixture and the Part B mixture, and the additional additives (e.g., cure accelerators, cure retardants, plasticizers, additives, and/or fillers, as well as UV absorbers, flow aids, rheology control agents, and catalysts) can also be present in both the Part A mixture and the Part B mixture.

The coating composition including the Part A and Part B mixtures prior to complete drying and curing may have a solids content of 50% to 90% and a Brookfield viscosity of 60 to 120 cPs. For example, in some embodiments, the coating composition prior to complete drying and curing may have a solids content of 50% to 70% and a Brookfield viscosity of 60 to 80 cPs. After the Part A and Part B mixtures are combined, the coating composition is coated onto the substrate. The coating process may be any suitable process such as die-coating, spraying, brushing, dipping, rolling, flow-coating, or the like. For example, in some embodiments, the coating process may be a continuous coating process or a batch coating process. In an exemplary continuous coating process, such as a continuous flow-coating process, the rate of mixing the Part A and Part B components, and the rate of coating the resulting coating composition can be controlled, for example, through metering, so that the viscosity of the coating composition remains within 80 to 120 cPs. In particular, the metering process involves controlling the amount of the Part A and Part B components that are mixed together at any given time such that only a certain amount of each component is introduced into the mixing vessel of a flow coating apparatus at any given time. By slowly introducing the Part A and Part B components into the mixing vessel (instead of pouring the entire contents of those components into the vessel), the viscosity of the composition can be better controlled, and the composition can be deposited on the substrate at a more uniform thickness. In contrast, when the entire contents of the Part A and Part B components are introduced to the mixing vessel of the flow coating apparatus at the same time, the portion of the composition that is deposited first may have a viscosity different from the portion of the composition deposited last, since the last portion of the composition will have been subjected to additional reaction time inside the mixing vessel (i.e., the time between beginning to deposit the coating to the time at which the last portion of the coating is deposited). That is, the time that any portion of the coating composition stays in the mixing vessel is not long enough that the reaction between the Part A and Part B components raises the viscosity of the resulting composition to over 120 cPs. For example, Part A and Part B components may not stay in the mixing vessel for longer than 20 minutes, or 15 minutes. For example, when the Part A component is added to the mixing vessel of a coating apparatus at a rate of one gallon per hour, the Part B component could be added to the mixing vessel at a rate such that the NCO/OH ratio of the portion of the composition inside the mixing vessel is 3:2 to 1:1. In the meantime, in some embodiments, the rate at which the coating composition is deposited on the substrate is also controlled such that the Part A component is dispensed from the mixing vessel of the coating apparatus at a rate of one gallon per hour. Each of the Part A and Part B components may be mixed in a pressure pot or metered using a suitable metering apparatus, such as Graco DL-3 mixing machine.

By metering the Part A and Part B components as discussed here, the viscosity of the composition may be kept generally uniform, which, in turn, enables deposition of a coating layer with a generally uniform thickness. As used herein, the term "generally" is used as a term of approximation and not a term of degree, and is intended to account for the inherent deviations in measured or calculated values that would be recognized by those of ordinary skill in the art. Accordingly, as used herein, "generally uniform" and similar terms mean that the thickness or viscosity is mostly the same throughout the composition or layer, and that any deviations from uniformity are within art recognized standard deviations. The deposition of a coating layer having a generally uniform thickness enables effective abrasion resistance using a lower thickness coating, which improves cost-effectiveness.

The coating composition may be dried after being coated on the substrate and further cured to form an abrasion resistant coating on the substrate. The curing may be achieved by UV curing, thermal curing, or any other suitable curing method. Methods of curing polyurethane coating compositions are known to those of ordinary skill in the art.

The coating compositions of the present invention may be applied to any suitable dry film thickness. For example, in certain embodiments, the coating composition may be applied to a dry film thickness of 1 mil to 5 mils. In some embodiments, for example, the coating composition is applied to a dry film thickness of 1 mil (25 μm) to 3 mils (75 μm).

Test Methods

Haze and Luminous Transmittance Tests

The haze and luminous transmittance test is conducted on a 3 inch by 12 inch coupon (sample) according to ASTM D1003 using a Haze-Gard Plus instrument. Haze measures the clearness and transparency of the film (the film should not be translucent and diffuse light), while luminous or visible light transmittance indicates the amount of visible light transmitted through the sample.

Bayer Abrasion Test

The abrasion resistance test is conducted on a 2 inch by 2 inch coupon (sample) according to ASTM F735 for 600 cycles. The above-described haze and luminous transmittance test is conducted both prior to the Bayer abrasion test, and after 600 cycles of the Bayer Abrasion test.

Whereas particular embodiments of the present disclosure have been described above for purposes of illustration, it will be understood by those skilled in the art that numerous variations of the details of the present disclosure may be made without departing from the invention as defined in the appended claims, and equivalents thereof. For example, while "a" polyester diol, "a" di-isocyanate, "a" fluorocarbon-based additive, and "a" multifunctional polyol have been described in connection with the coating composition, two or more polyester diols, two or more di-isocyanates, two or more fluorocarbon-based additive, and two or more multifunctional polyols can be used in the coating composition.

Although various embodiments of the present disclosure have been described in terms of "comprising" or "including," embodiments consisting essentially of or consisting of are also within the scope of the present disclosure. For example, while the present disclosure describes a coating composition including a polyester diol, a di-isocyanate, and a fluorocarbon-based additive, a coating composition consisting essentially of or consisting of a polyester diol, a di-isocyanate, and a fluorocarbon-based additive is also within the scope of the present disclosure. Thus, as described above, the coating layer may be formed from a coating composition consisting essentially of a polyester diol, a di-isocyanate, and a fluorocarbon-based additive. In this context, "consisting essentially of" means that any additional components in the coating composition will not materially affect the abrasion resistance of the coating layer.

As used herein, unless otherwise expressly specified, all numbers such as those expressing values, ranges, amounts or percentages may be read as if prefaced by the word "about," even if the term does not expressly appear. Further, use of the word "about" reflects the penumbra of variation associated with measurement, significant figures, and interchangeability, all as understood by a person having ordinary skill in the art to which this disclosure pertains. Any numerical range recited herein is intended to include all sub-ranges subsumed therein. Plural encompasses singular and vice versa. For example, while the present disclosure describes "a" polyester diol, a mixture of such polyester diols can be used. Also, as used herein, the term "polymer" is meant to refer to prepolymers, oligomers, and both homopolymers and copolymers; the prefix "poly" refers to two or more. When ranges are given, any endpoints of those ranges and/or numbers within those ranges can be combined within the scope of the present disclosure. Notwithstanding that the numerical ranges and parameters set forth herein may be approximations, numerical values set forth in the specific examples are reported as precisely as is practical. Any numerical value, however, inherently contains certain errors necessarily resulting from the standard variation found in their respective testing measurements.

The term "comprising" and variations thereof as used in this description and in the claims do not limit the disclosure to exclude any variants or additions. The terms "including" and like terms mean "including but not limited to." Similarly, as used herein, the terms "on," "applied on," and "formed on" mean on, applied on, or formed on, but not necessarily in contact with the surface. For example, a coating layer "formed on" a substrate does not preclude the presence of one or more other coating layers of the same or different composition located between the formed coating layer and the substrate.

The present invention has been described with reference to example embodiments and aspects, but is not limited thereto. Persons of ordinary skill in the art will appreciate that other modifications and applications can be made without meaningfully departing from the invention. For example, although the coating compositions are described as being useful for aerospace applications, they may be useful for other applications as well. Accordingly, the foregoing description should not be read as limited to the precise embodiments and aspects described, but should be read consistent with and as support for the following claims, which are to have their fullest and fairest scope.

What is claimed is:

1. A coating composition comprising:
   a polyester diol;
   a di-isocyanate; and
   a fluorocarbon-based additive,
   wherein a 25 micron to 75 micron thick coating layer resulting from curing the coating composition has a Bayer abrasion resistance value of less than 1% Haze after 600 cycles.

2. The coating composition of claim 1, wherein the fluorocarbon-based additive comprises a functional group reactive with —OH or —NCO.

3. The coating composition of claim 1, wherein the fluorocarbon-based additive comprises a hydroxyl functional group.

4. The coating composition of claim 1, wherein the fluorocarbon-based additive comprises a perfluorinated carbon atom and a hydroxyl functional group, an acrylate functional group, or a methacrylate functional group.

5. The coating composition of claim 4, wherein the fluorocarbon-based additive comprises two to twelve perfluorinated carbon atoms.

6. The coating composition of claim 4, wherein the fluorocarbon additive comprises a compound represented by $CF_3(CF_2)_nCH_2CH_2OH$, $CF_3(CF_2)_nCH_2CH_2COOCCH_3$, or $CF_3(CF_2)_nCH_2CH_2COOCCH_2CH_3$, wherein n is an integer.

7. The coating composition of claim 6, wherein n is 5.

8. The coating composition of claim 1, wherein the fluorocarbon-based additive is included in an amount of 0.25% to 2% based on a total weight of the coating composition.

9. The coating composition of claim 1, wherein the polyester diol has a weight average molecular weight of 500 to 2000.

10. The coating composition of claim 1, wherein the polyester diol is included in an amount of 2% to 15% based on a total weight of the coating composition.

11. The coating composition of claim 1, wherein the polyester diol comprises a caprolactone derived monomer terminated with a primary hydroxyl group at both ends.

12. The coating composition of claim 1, further comprising a multifunctional polyol having three or more hydroxyl groups.

13. The coating composition of claim 12, wherein the multifunctional polyol comprises a tetra-functional polyol.

14. The coating composition of claim 1, wherein the polyester diol is included in an amount of 2% to 50% based on a total weight of the polyester polyol.

15. The coating composition of claim 1, wherein the coating composition has a Brookfield viscosity of 80 to 120 cPs.

16. The coating composition of claim 1, wherein the coating composition has an NCO/OH ratio of 1 to 1.5.

17. The coating composition of claim 1, wherein the coating composition has a solids content of 50% to 90%.

18. A coated article, comprising:
   a substrate; and
   a 25 micron to 75 micron thick coating layer on the substrate, the coating layer comprising a polyurethane reaction product of reactants comprising:
      a polyester diol,
      a di-isocyanate, and
      a fluorocarbon-based additive,
   the coating layer having a Bayer abrasion resistance value of less than 1% Haze after 600 cycles.

19. The coated article of claim 18, wherein the coating layer has a surface hardness of 60 A to 90 A.

20. A method for manufacturing an abrasion resistant substrate, the method comprising:
   mixing reactants comprising a polyester diol, a di-isocyanate and a fluorocarbon-based additive to form a polyurethane coating composition;
   depositing the polyurethane coating composition on the substrate; and
   curing the polyurethane coating composition to form an abrasion resistant coating on the substrate, the abrasion resistant coating having a thickness of 25 microns to 75 microns and a Bayer abrasion resistance value of less than 1% Haze after 600 cycles.

21. The method of claim 20, wherein depositing the polyurethane coating composition comprises deposition by a continuous flow coating technique.

* * * * *